(12) United States Patent
Heine (10) Patent No.: US 6,295,173 B1
(45) Date of Patent: Sep. 25, 2001

(54) CONFIGURATION FOR COLOR DIVISION AND/OUR RECOMBINATION

(75) Inventor: Claus Heine, Chur (CH)

(73) Assignee: Unaxis Balzers Aktiengesellschaft, Blazers (LI)

( * ) Notice: Subject to any disclaimer, the term of this patent is extended or adjusted under 35 U.S.C. 154(b) by 0 days.

(21) Appl. No.: 09/226,368

(22) Filed: Jan. 6, 1999

(30) Foreign Application Priority Data

Dec. 18, 1998 (CH) .................................... 2510/98

(51) Int. Cl.⁷ ...................................... G02B 5/04
(52) U.S. Cl. .................. 359/833; 359/834; 359/634; 359/640
(58) Field of Search ...................... 359/583, 618, 359/629, 634, 636, 638, 640, 833, 834

(56) References Cited

U.S. PATENT DOCUMENTS

| 3,202,039 | 8/1965 | De Lang et al. . | |
| 5,600,487 | 2/1997 | Kiyomoto et al. | 359/634 |
| 5,777,674 | 7/1998 | Ohumuro | 348/338 |
| 5,777,789 | 7/1998 | Chiu et al. | 359/494 |
| 5,786,937 | * 7/1998 | Chu et al. | 359/583 |
| 5,986,815 | * 11/1999 | Bryars | 359/634 |

FOREIGN PATENT DOCUMENTS

| 0364043 | 10/1989 | (EP) . |
| 9805996 | 2/1998 | (WO) . |

OTHER PUBLICATIONS

Search Report in Priority Application (CH 251098, dated Dec. 18, 1998).

* cited by examiner

*Primary Examiner*—Cassandra Spyrou
*Assistant Examiner*—Euncha Cherry
(74) *Attorney, Agent, or Firm*—Notaro & Michalos P.C.

(57) ABSTRACT

A configuration of prisms is capable of spectral division, or spectral color combination, or both simultaneously even with reflected light that undergoes a change of polarization. The configuration includes first and second prisms each with pairs of faces that respectively form first and second prism angles. One face of one prism is engaged against one face of the other prism with no air gap between. Light of a first spectral range is incidence substantially perpendicular on the other prism face of the first prism after entering the first prism and undergoing a double reflection before leaving the first prism. Light of a second and third spectral range are also incident on the other face of the first prism and pass substantially unreflected through the first prism. Light of the second spectral range after leaving the first prism and entering the second prism is double reflected in the second prism. Light of the third spectral range substantially passes through the second prism as well without reflection. A thin film system is provided between the engaged faces of the first and second prism and has a spectral reflection behavior as a function of the angle of incidence of the reflected light which is matched to the first and second prism angle such that light of the first spectral range, at an angle of incidence which is about equal to the first prism angle, is at least largely reflected and light incidence at this same angle but of the second and third spectral range is at least largely transmitted. Light of the second spectral range at an angle of incidence of twice the second prism angle minus the first prism angle is largely reflected.

18 Claims, 10 Drawing Sheets

FIG.1

FIG. 2 a₁) ——————— Angle of incidence 20° P-polarization
a₂) - - - - - - - Angle of incidence 20° S-polarization

FIG.3a b₂) ——————— Angle of incidence 42° P-polarization
b₁) - - - - - - - Angle of incidence 42° S-polarization

FIG.3b

FIG. 4
(b₂) —— Angle of incidence 11° P-polarization
(b₁) ---- Angle of incidence 11° S-polarization

CONFIGURATION FOR COLOR DIVISION AND/OUR RECOMBINATION

FIELD AND BACKGROUND OF THE INVENTION

The present invention relates to a configuration for the spectral color division and/or recombination of light according to the preamble of claim 1.

U.S. Pat. No. 3,202,039 discloses a configuration for color division. It comprises a first prism with two first faces which form a first prism angle. On a second prism two faces form the second prism angle. One of the first and second faces each are disposed in parallel opposite one another. In this respect, the prism angles are positioned in alternating angular configuration. The opposing faces of the prisms are spaced apart by an air gap. The total reflections realized thereon lead from time to time to the targeted light division.

With respect to spectral color division and/or recombination operating according to a similar principle, reference can be made to U.S. Pat. Nos. 5,777,789 or 5,644,432. Baumeister, "Reflectors with Phase Compensation for a Reflective LC Colour Projection System", SID 98 DIGEST, pp. 679.

Realization of said air gap considerably raises the expenditures for the production of such systems. Added to this is the fact that through the total reflections a phase rotation between S- and P-polarization is induced which can only be controlled with difficulty. Without additional measures this phase rotation has a strong effect on the contrast of the light division. A further disadvantage is that light is misdirected to the air gap, due to the non-ideal interfacial surfaces, which often leads to a decrease of the image quality.

U.S. Pat. No. 5,748,365 discloses a so-called K prism in which, according to the graphic representation, prisms are disposed one on the other without an air gap. Thereby light-dividing faces are formed such that incident white light multiple reflection into a blue and a green channel, the red light is transmitted through the configuration.

It is the task of the present invention to propose a configuration of the type described in the introduction, which, on the one hand, retains the advantageous effect of a configuration as known, for example, from U.S. Pat. No. 3,202,039; and but, on the other hand, eliminates its disadvantages with respect to the image quality as well as also the production expenditures. This is attained when implementing the configuration according to the invention.

The present invention uses the following definitions:
Definitions

| | |
|---|---|
| • Light, visible light: | light with maximum energy in the spectral range 380 nm–720 nm |
| • red light: | light with maximum energy in the spectral range 580 nm–780 nm, in particular in the spectral range 600 nm–680 nm |
| • green light: | light with maximum energy in the spectral range 490 nm–605 nm, in particular in the spectral range 500 nm–600 nm |
| • blue light: | light with maximum energy in the spectral range 380 nm–510 nm, in particular in the spectral range 420 nm–500 nm |
| • yellow light: | light with maximum energy in the spectral range 560 nm–605 nm, in particular at 578 ± 3 nm |
| • white light: | light with red, blue and green light components |
| transparent: | negligible absorption in the spectral range 380 nm–720 nm |
| AdR: | "Angle-dependent Reflection", spectral reflection behavior as a function of the angle of incidence of the reflected light |
| AOI: | Angle of incidence |

Consequently, according to the invention the color division - with corresponding reflection—on the configuration according to the invention takes place by providing a thin film layer system between the prisms, which with respect to its AdR is matched to the prism angles. This permits, on the one hand, eliminating the disadvantages of the configuration prior known from U.S. Pat. No. 3,202,039 with respect to the air gap thereby that the opposing faces of the prisms can, according to the invention, oppose one another without an air gap. This permits the elimination of all of the disadvantages entailed in the described air gap regarding fabrication problems and image problems.

The light splitter configuration according to the invention compared with the division or recombination principle on so-called X-cubes, such as are known from the WO98/20383 by the same applicant, results on the configuration according to the invention in relatively small angles of incidence of the light on the thin film layer system essential for the color division and provided according to the invention. Therefrom follows further that, compared with the beam division or recombination on thin film layer systems of an X-cube, on the configuration according to the invention a very much smaller polarization shift of the light on its thin film layer system needs to be taken into consideration. In addition, the angle dependence of the light transmission and division becomes less pronounced which, in turn, has a positive effect on the fabrication tolerances to be maintained.

The possibility is given, furthermore, of better scattered light suppression on the light splitter according to the invention which increases the image quality and therein primarily the contrast.

This results in particular from the fact that the geometric conditions can be flexibly adapted on the configuration according to the invention.

Preferred embodiments of the invention are specified as is a system according to the invention in. In the following the invention will be explained by example with reference to the Figures.

DESCRIPTION IF THE PREFERRED EMBODIMENTS

Figure 1:
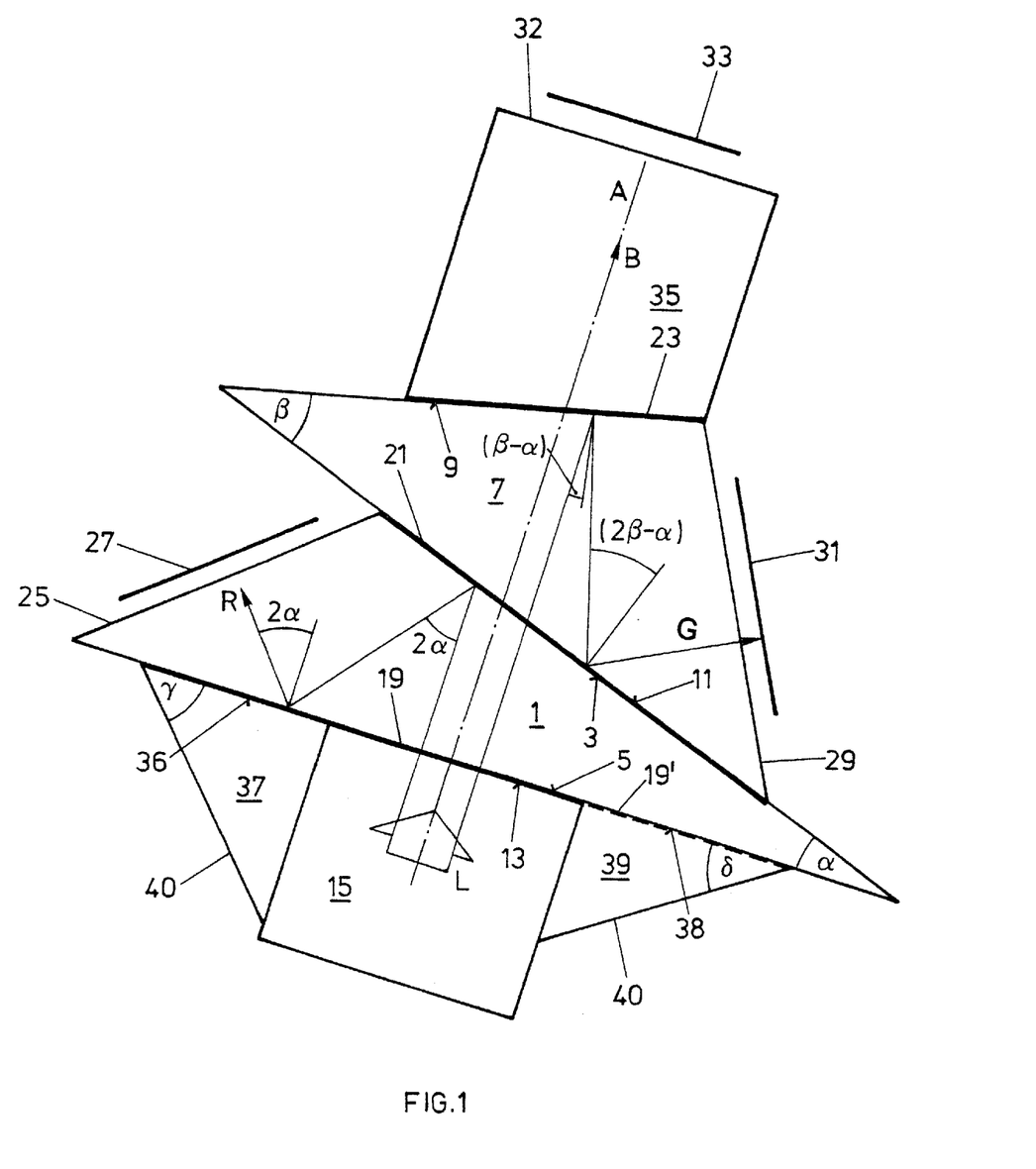
FIG. 1 schematically illustrates a preferred embodiment of a configuration according to the invention.

According to FIG. 1 a first prism 1 is provided with two first faces 3 and 5 which spread between the first prism angle a. A second prism 7 comprises second prism faces 9 and 11, which spread between a second prism angle β. The first prism face 3 and the second face 11 are disposed opposing one another in parallel. Between them a first thin film layer system 21 is provided. In the depicted preferred embodiment the prism faces 3 and 11 are disposed opposite one another via the thin film layer system 21 free of an air gap.

The further first prism face 5, in turn, is disposed on the configuration according to the FIG. 1 opposite the face 13 of a polarization beam splitter 15 with a second thin film layer system 19 being provided between these faces 5, 13, preferably again without an air gap.

In the preferred depicted embodiment the thin film layer system 19 extends preferably unilaterally over the area of the opposing faces 5, 13 where it, preferably without an air gap, is disposed between said face 5 and the one prism face 36 of a further prism 37. On the other side of the stated area also a further prism 39 is in contact with its one prism face 38 on the face 5. The emergent faces of the prisms 37, 39 are preferably provided with an antireflection layer system 40.

Opposite the further second prism face 9 the face of a compensation body 35 is disposed, preferably via a third thin film layer system 23 and free of an air gap. The two prisms 1 and 7 define each emergent faces 25 and 29, respectively, opposite to which are provided in the preferred embodiment, light valve configurations 27 and 31, respectively, preferably light valve configurations operating in reflection, such as LCD configurations.

With the aid of the compensation body 35 the oblique orientation of the prism face 9 with respect to its optical axis A is compensated, and the compensation body 35 forms the third emergent face 32 with which, again, is associated a light valve configuration 33, preferably in the form of a light valve configuration operating in reflection, preferably an LCD configuration.

Visible light, in general white light L, enters substantially perpendicularly to faces 5 and 13 into the first prism 1 and is incident at the angle of incidence a on the thin film layer system 19. It is here reflected and emerges from emergent face 25.

At the thin film layer system 21 light of a second and third spectral range, preferably green and blue light, is largely transmitted and passes through the second prism 7. Light of the second spectral range, preferably green light, is reflected at the thin film layer system 23 at the angle of incidence (β−α), subsequently again on thin film layer system 21 at the angle of incidence (2β−α). It subsequently emerges on emergent face 29. The light of the third spectral range, preferably blue light, is largely transmitted at thin film layer system 23 and emerges at the emergent face 32 of the compensation body 35. Compensation body 35, the two prisms 1 and 7, the polarization beam splitter 15 and the prisms 37, 39 are transparent; they are comprised, for example, of glass.

The light emergent on said emergent faces 25, 29, 32 is preferably modulated on the light valve configurations 27, 31, 33 and, customarily under a polarization change, reflected back along the stated ray paths in order to, after recombination, emerge at L with reversed propagation direction.

However, it is readily possible to introduce light of the stated spectra from the outside onto light valve configurations 27, 31, 33 operating in transmission, to modulate it there, and subsequently to use the described configuration exclusively as recombination optics.

Figure 2:
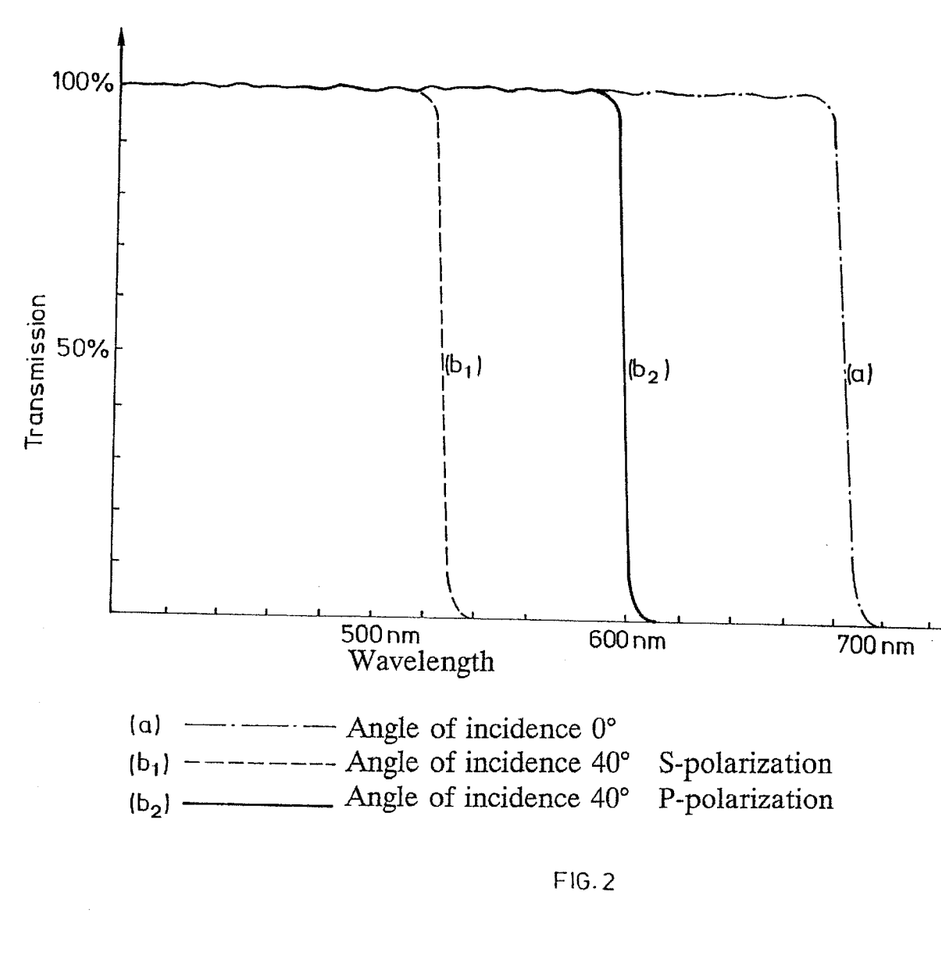
FIG. 2 is a qualitative spectra on a thin film layer system of the configuration according to FIG. 1, FIG. 3a are each a representation analogous to FIG. 2, of a quantitative spectra on a and 3b further thin film layer system of the configuration according to FIG. 1.

In FIG. 2 are shown qualitatively spectral transmission curves of the thin film layer system 19. At the angle of incidence of at least approximately 0° on the thin film layer system 19 the spectral transmission curve (a) is obtained, i.e. light of the visible spectral range is transmitted.

Spectrum ($b_1$) shows the transmission behavior with respect to S-polarized light which is incident on the thin film layer system 19 at an angle of incidence of 40°, while spectrum ($b_2$) shows the transmission behavior of P-polarized light at an angle of incidence of 40°.

As is evident in FIG. 1, the axis A determined by the face normal onto the thin film layer system is referred to as optical axis A. The polarization beam splitter 15 can be rotated about this axis. In FIG. 1 the orientation of the polarization beam splitter 15 is preferably selected such that light incident on the beam splitter 15 in S-polarization is P-polarized light with respect to the color divider configuration according to the invention. In an embodiment differing herefrom the polarization beam splitter is pivoted about the optical axis A such that S-polarized light incident on the polarization beam splitter 15 in the color divider is also S-polarized light.

It is further evident in FIG. 2 that the reflection behavior of the thin film layer system 19 is largely independent of the polarization for light of the first spectral range, preferably for red light; this light, for example at 2α=40°, but in any case largely reflected.

The first prism 1 and the preferably provided polarization beam splitter 15 are preferably cemented with one another, and, further preferred, the thin film layer system 19 is applied on face 5 of the first prism 1.

Figure 3A:
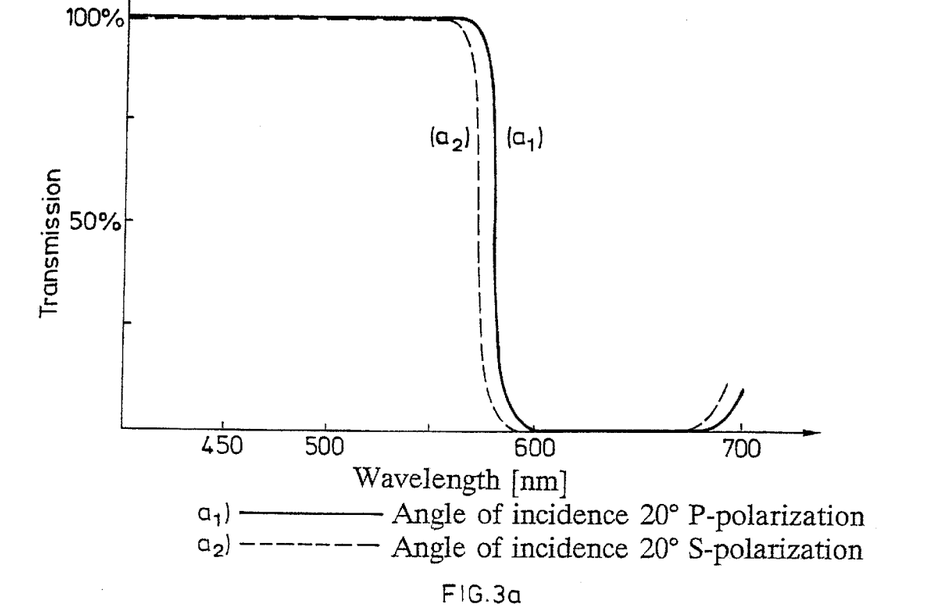

In FIG. 3a the transmission behavior of the thin film layer system 21 is shown which, as was stated, is to reflect at least largely light, incident at angle α, of the first spectral range, preferably red light. It is to transmit at least largely light of the second and third spectral ranges, preferably blue and green light incident at angle α. Light of the second spectral range, preferably green light, incident at the angle of incidence (2β−α), is to be at least largely reflected.

The profile ($a_1$) of FIG. 3a shows the transmission behavior of the thin film layer system 21 with respect to P-polarized light incident at angle α=20°; profile ($a_2$) applies to S-polarized light incident at the same angle of incidence α=20°.

This shows clearly that light of the first spectral range, preferably red light, is largely reflected, substantially independently of its polarization and that, as required, green and blue light is largely transmitted.

With α=20° further is selected for example $$\beta = 31°$$

This results in (2β−α)=42°.

Figure 3B:
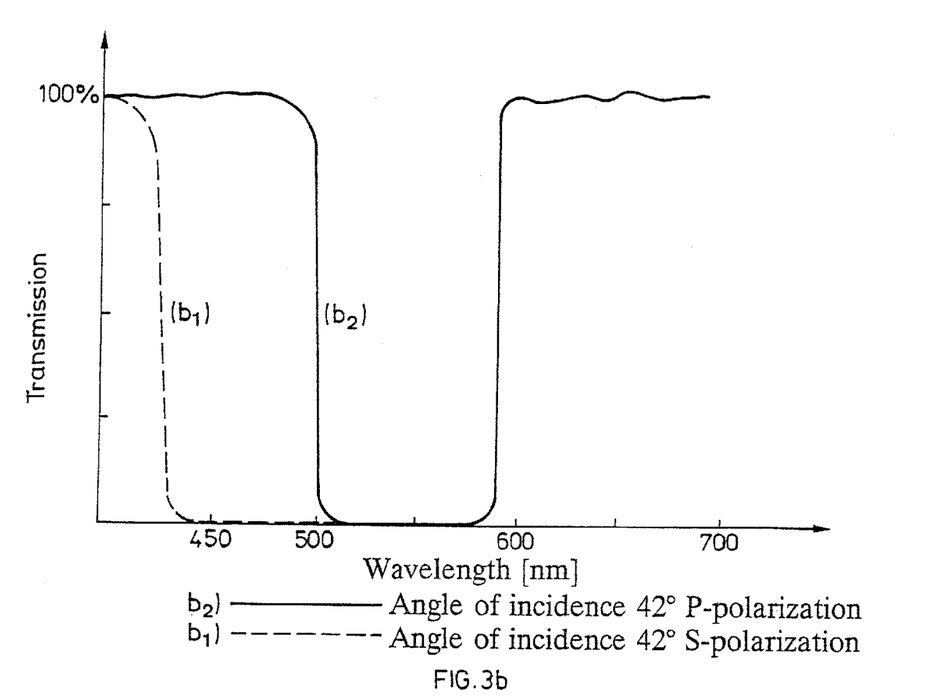

In FIG. 3b the transmission spectrum of the thin film layer system 21 at an angle of incidence of 42° for S-polarized light, (b1), and for P-polarized light, (b2), is shown. It is evident that light of the second spectral range, thus preferably of the green spectral range, is reflected on the thin film layer system 21 without the polarization having any effect thereon.

Faces 11 and 3 of the two prisms 7 and 1 are again preferably cemented with one another and the thin film layer system 21 can be realized by layers on face 3 and/or on face 11.

Acting on face 9 of the second prism 7 is the third thin film layer system 23. As stated, this is to reflect largely light of the second spectral range, preferably green light incident at an angle ($\beta-\alpha$) on the layer system 23, while light of the third spectral range, preferably blue light incident at this angle on the thin film layer system 23, is to be at least largely transmitted.

With the stated values for $\alpha$ and $\beta$ applies:

$$\beta-\alpha=11°.$$

Figure 4:
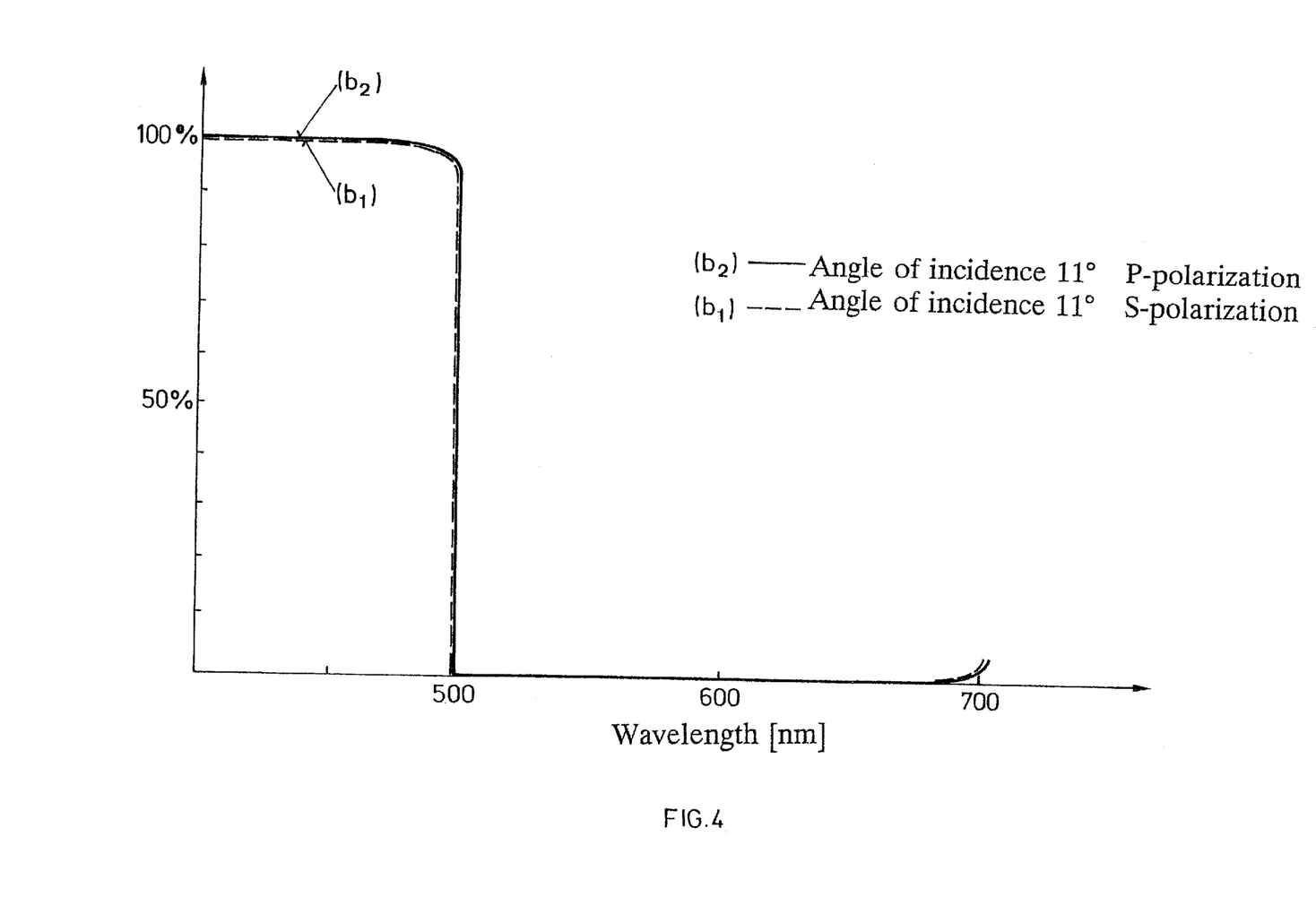
FIG. 4 is a representation analogous to FIGS. 2 and 3, of a spectra of a third thin film layer system provided on the configuration according to FIG. 1.

In FIG. 4 is shown the transmission spectrum of the thin film layer system 23 at an angle of incidence of 11°. Therein denote (b1) the spectrum for S-polarized light, (b2) that for P-polarized light.

It is evident that largely, independently of polarization, on this layer system 23 light of the second spectral range, namely preferably green light, is substantially reflected; in contrast, light of the third spectral range, preferably blue light, is largely transmitted.

As has been stated, the light of the associated spectral ranges, emergent from the emergent faces 25, 29, 32, is preferably reflected on light valves 27, 31, 33 operating in reflection, and emerges again after recombination from the configuration according to the invention.

An important parameter of the first prism 1 which, like the remaining prisms and bodies of the configuration, is fabricated of glass or optically similar material, is, as became clear, its angle $\alpha$.

As has been described, a portion of the light is incident at angle $2\alpha$ on the layer system 19. The AdR caused by this angle must be sufficient on layer system 19 to transmit light of the first spectral range, preferably red light, at nearly perpendicular incidence, on the other hand, to reflect it at an angle of incidence of at least approximately $2\alpha$. As noted above, AdR is the Angle-dependent Reflection, that is, the special reflection behavior as a function of the angle of incidence of the reflected light.

In the following Table is listed by example the shift of the 50% cutoff point in the case of the film layer system 19 selected in the example for P-polarized red light as a incidence.

| Angle of Incidence | 50% Cutoff Point |
|---|---|
| 0 | 684 nm |
| 10 | 676 nm |
| 20 | 656 nm |
| 30 | 623 nm |
| 40 | 580 nm |

For S-polarized light the 50% cutoff point (see FIG. 2) is already shifted to lower wavelenghts such that as soon as the stated condition for P-polarized light is fulfilled, it is already fulfilled moreover for S-polarized light.

In order to reflect effectively the red spectral range of the light is preferably selected:

$$2\alpha \geq 20°, \text{ thus}$$

$$\alpha \geq 10°.$$

The greater $\alpha$, the more serious the polarization shift on layer system 21. A natural limitation upward is formed by the angle 45°. In this case the light is no longer reflected back onto the layer system 19. However, it is useful to maintain $\alpha$ at $\leq 30°$. This determines, together with the dimensioning of the light valve configuration 27, the other dimensions of prism 1. It appears best today to select:

$$\alpha=20°\pm 20\%.$$

The remaining angles of the first prism 1 should be selected such that the light impinges perpendicularly from the prism onto the light valve configuration 27. Thus, $$10° \leq \alpha \leq 45°$$

applies, and preferably $$10° \leq \alpha \leq 30°,$$

and in particular preferred $$\alpha=20°\pm 20\%.$$

The most important dimensioning parameter on the second prism 7 is the prism angle $\beta$. With ($2\beta-\alpha$) this angle determines, as a function of $\alpha$, the angle of incidence of the light reflected by layer system 23 onto the layer system 21. The angular difference between $\alpha$ and ($2\beta-\alpha$) determines the optical effect of the thin film layer system 21, in particular on the light of the second spectral range, preferably of the green light. Therein must apply:

$$\alpha<\beta<½(90°+\alpha).$$

This yields for the preferred dimensioning of $\beta$:

$$10° \leq \beta \leq 65°.$$

The remaining angles of prism 7 must be selected such that the light of the second spectral range emerges perpendicularly from the emergent face 29 and impinges on the light valve configuration 31.

The face 9 of the second prism 7 is preferably cemented via the thin film layer system 23 with the compensation body 35 which is dimensioned such that light of the third spectral range, preferably blue light, emerges perpendicularly from this body and, preferably, the optical path lengths of all three spectral ranges of the light through the configuration are at least substantially identical.

One solution can, if appropriate, comprise equalizing the path lengths through locally differing placement of the light valve configurations.

However, light must also be taken into consideration which, due to non-ideal conditions, in particular non-ideal interfacial surfaces, is misdirected. It is assumed that the polarization beam splitter 15 is oriented such that the light penetrating through layer 19 with respect to face 3 is substantially P-polarized. On layer system 21 should–as was stated–be reflected ideally exclusively light of the first spectral range, i.e. preferably red light. But, due to non-ideal interfacial surfaces a small fraction each of the second and third spectral range, thus preferably of blue and green light, is nevertheless reflected on thin film layer system 21. It is, in addition, often of advantage to suppress light of the yellow spectral range during its passage. For this purpose angle $\alpha$ and/or the layer system 21 can readily be laid out such that the intensive yellow line, often occurring at approximately 578 nm, is reflected to the desired extent on thin film layer system 21.

As evident in conjunction with FIG. 2, on thin film layer system 19 yellow light, thus light with a spectral component in the upper wavelength range of the second spectral range, preferably in the green range, as well as also in the lower wavelength range of the first, thus preferably in the red, is transmitted on thin film layer system 19. This yellow light, especially if it is P-polarized, and in particular around the spectral line at approximately 578 nm, according to FIG. 3a, is reflected on thin film layer system 21 in order to be subsequently transmitted again according to FIG. 2 ($b_2$). The spectral edge according to FIG. 2 ($b_2$) is selected such that the yellow line in the desired extent is transmitted at thin film layer system 19 and at a direction of incidence $2\alpha$. The efficient coupling-out of this yellow light transmitted on system 19 takes place by providing prism 37 described in conjunction with FIG. 1, which permits said yellow light to emerge at a small angle.

Light of the spectral range, thus preferably red light which non-ideally is transmitted through the thin film layer system 21, is (see FIG. 4) in any event reflected on thin film layer system 23. At the angle of incidence of $(2\beta-\alpha)$ arriving again on the layer system 21, it is (see FIG. 3b) transmitted at thin film layer system 21 and is incident on thin film layer system 19 at an angle $2(\beta-\alpha)$. Due to the small angle of incidence, at $\alpha=20°$, $\beta=31°$, of 22° a substantial component of this scattered light is transmitted through the potential, as shown in FIG. 1 in dashed lines, layer system 19 extended also to prism 39 with the additional prism 39 again enhancing this effect. In this area of face 5, consequently, an antireflection layer is provided as which also system 19' acts and/or a prism 39.

Blue light which is erroneously reflected on thin film layer system 23, is transmitted at $(2\beta-\alpha)$ on layer system 21, also on thin film layer system 19 and conforms to the path explained above of the red scattered light through the additional prism 39. Based on the described light path, it is clear that the prism angle $\gamma$ of prism 37 preferably and at least approximately is selected as $\gamma=2\alpha$, angle $\delta$ of prism 39 at least approximately as $\delta=2(\beta-\alpha)$.

Figure 6:
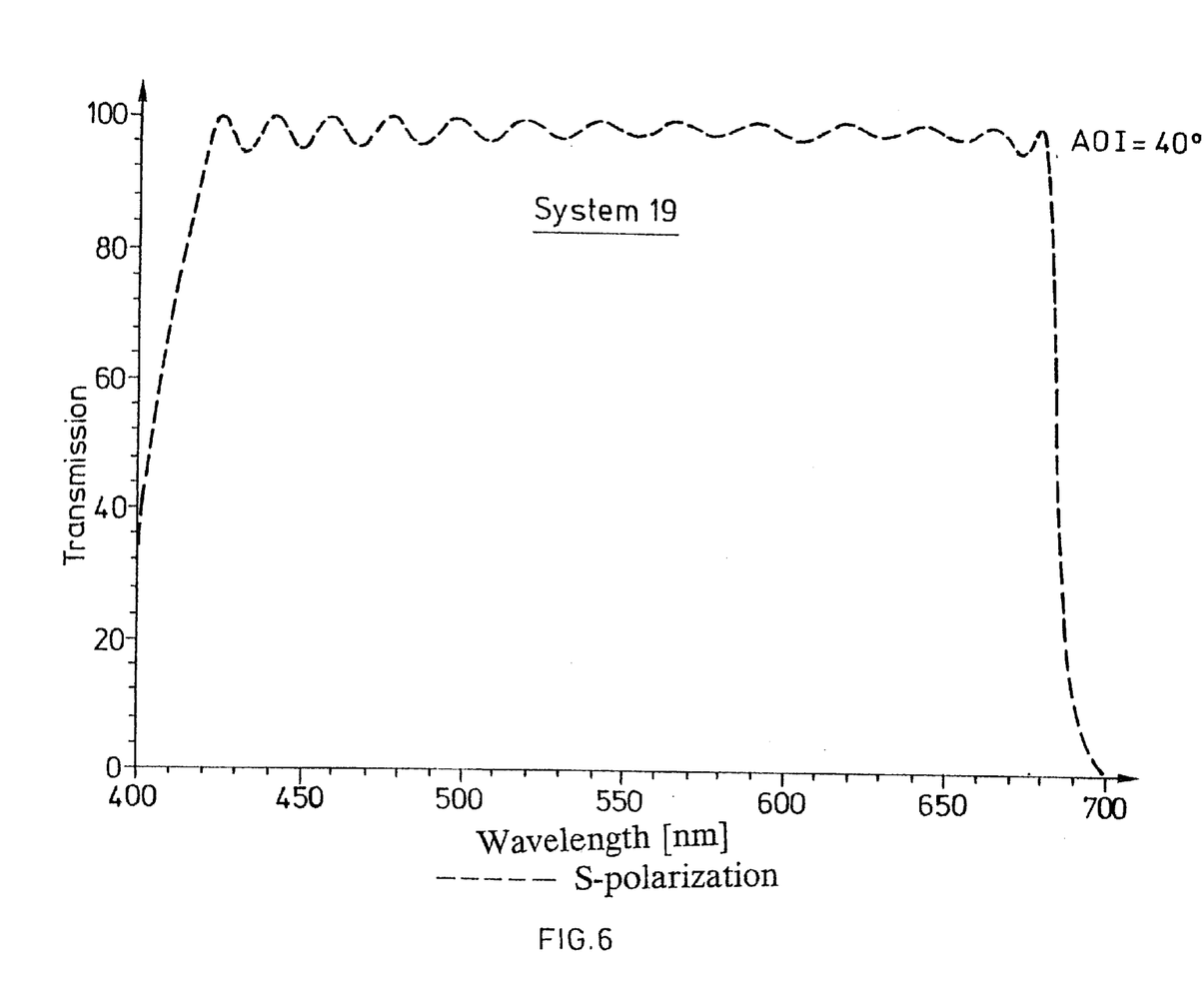
FIG. 6 is the spectrum on a thin film layer system of the configuration according to FIG. 1 in a realization and in analogy to spectrum (a) of FIG. 2.

Starting from the depiction according to FIG. 1, in FIG. 6 the just described path of the yellow I and blue scattered light II is shown.

If thus, as preferred, light L according to FIG. 1 in P-polarization is coupled-in, which can be simply realized, for example, through the suitable orientation of the polarization beam splitter 15, or though an additional $\lambda/2$ plate between polarization beam splitter 15 and thin film layer system 19, then

| | |
|---|---|
| Scattered light of the spectral range, red light | is reflected on system 23 at $(\beta - \alpha)$ for example 11°, (FIG. 4), |
| | transmitted on system 21 at $(2\beta - \alpha)$, for example 42°. FIG. 3b ($b_2$); |
| | transmitted on system 19 at $2(\beta - \alpha)$, for example 22°, (FIG. 2, between (a) and ($b_2$)), |
| | and leaves the configuration through prism 39. |
| Scattered light of the third spectral range, blue light | is transmitted on system 21 at $(2\beta - \alpha)$, for example 42°, FIG. 3b ($b_2$), |
| | is transmitted on system 19, at $2(\beta - \alpha)$, for example 22°, (FIG. 2), |
| | and leaves the configuration through prism 39. |
| Yellow light (585 nm ±) | is largely reflected on system 21 at $\alpha$, for example 20°, (FIG. 3a, ($a_1$)), |
| | is largely transmitted on system 19 at $2\alpha$, for example 40°, (FIG. 2, ($b_2$)), |
| | and largely leaves the configuration through prism 37. |

An analogous scattered light suppression is also possible in the case of S-polarized incident light L. However, the selection in this case largely takes place after the reflection on the light valves, since the latter changes the polarization of the light in reflection.

To increase the coupling-out of the misdirected light, thus yellow light, on prism 37 or blue or red light on prism 39, in a preferred embodiment and as shown in FIG. 1 at 40, between the stated prisms 37, 39 and the thin film layer system 19 an antireflection layer is provided in each case.

In the following Table examples of the realization of the thin film layer systems 19, 21 and 23 are shown. The layers comprising material with high refractive index H comprise $TiO_2$ (n≈2.4), the layers of lower refractive index material comprise $SiO_2$ (n≈1.46). As the substrate material glass is provided with n≈1.6.

The numbering of the layers takes place in the sequence in which they are deposited on the particular substrate (prisms).

| Layer Number | Thin film system 19 thicknesses in nm | | Thin film system 21 thicknesses in nm | | Thin film system 23 thicknesses in nm | |
|---|---|---|---|---|---|---|
| 1 | H | 96.91 | H | 92.44 | H | 69.71 |
| 2 | L | 151.89 | L | 138.41 | L | 126.17 |
| 3 | H | 83.62 | H | 73.40 | H | 56.21 |
| 4 | L | 144.53 | L | 148.47 | L | 99.33 |
| 5 | H | 80.56 | H | 53.04 | H | 68.30 |
| 6 | L | 144.12 | L | 164.16 | L | 104.93 |
| 7 | H | 78.31 | H | 48.87 | H | 57.72 |
| 8 | L | 145.42 | L | 161.54 | L | 97.92 |
| 9 | H | 76.73 | H | 51.22 | H | 63.03 |
| 10 | L | 147.18 | L | 159.18 | L | 108.91 |
| 11 | H | 75.50 | H | 50.39 | H | 59.40 |
| 12 | L | 148.37 | L | 160.56 | L | 96.74 |
| 13 | H | 74.52 | H | 51.25 | H | 59.40 |
| 14 | L | 148.74 | L | 156.96 | L | 108.91 |
| 15 | H | 74.52 | H | 52.18 | H | 63.03 |
| 16 | L | 148.37 | L | 158.14 | L | 97.92 |
| 17 | H | 75.50 | H | 51.32 | H | 57.72 |
| 18 | L | 147.18 | L | 157.58 | L | 104.93 |
| 19 | H | 76.73 | H | 52.41 | H | 68.30 |
| 20 | L | 145.42 | L | 156.79 | L | 99.33 |
| 21 | H | 78.31 | H | 51.58 | H | 56.21 |
| 22 | L | 144.12 | L | 158.96 | L | 126.17 |
| 23 | H | 80.56 | H | 51.23 | H | 69.71 |
| 24 | L | 144.53 | L | 158.02 | | |
| 25 | H | 83.62 | H | 51.35 | | |
| 26 | L | 151.89 | L | 160.50 | | |
| 27 | H | 96.91 | H | 49.60 | | |
| 28 | | | L | 162.95 | | |
| 29 | | | H | 48.96 | | |
| 30 | | | L | 164.50 | | |
| 31 | | | H | 46.73 | | |
| 32 | | | L | 172.06 | | |
| 33 | | | H | 46.90 | | |
| 34 | | | L | 183.78 | | |
| 35 | | | H | 32.01 | | |
| 36 | | | L | 173.14 | | |
| 37 | | | H | 101.40 | | |
| 38 | | | L | 33.33 | | |
| 39 | | | H | 15.00 | | |

Figure 7:
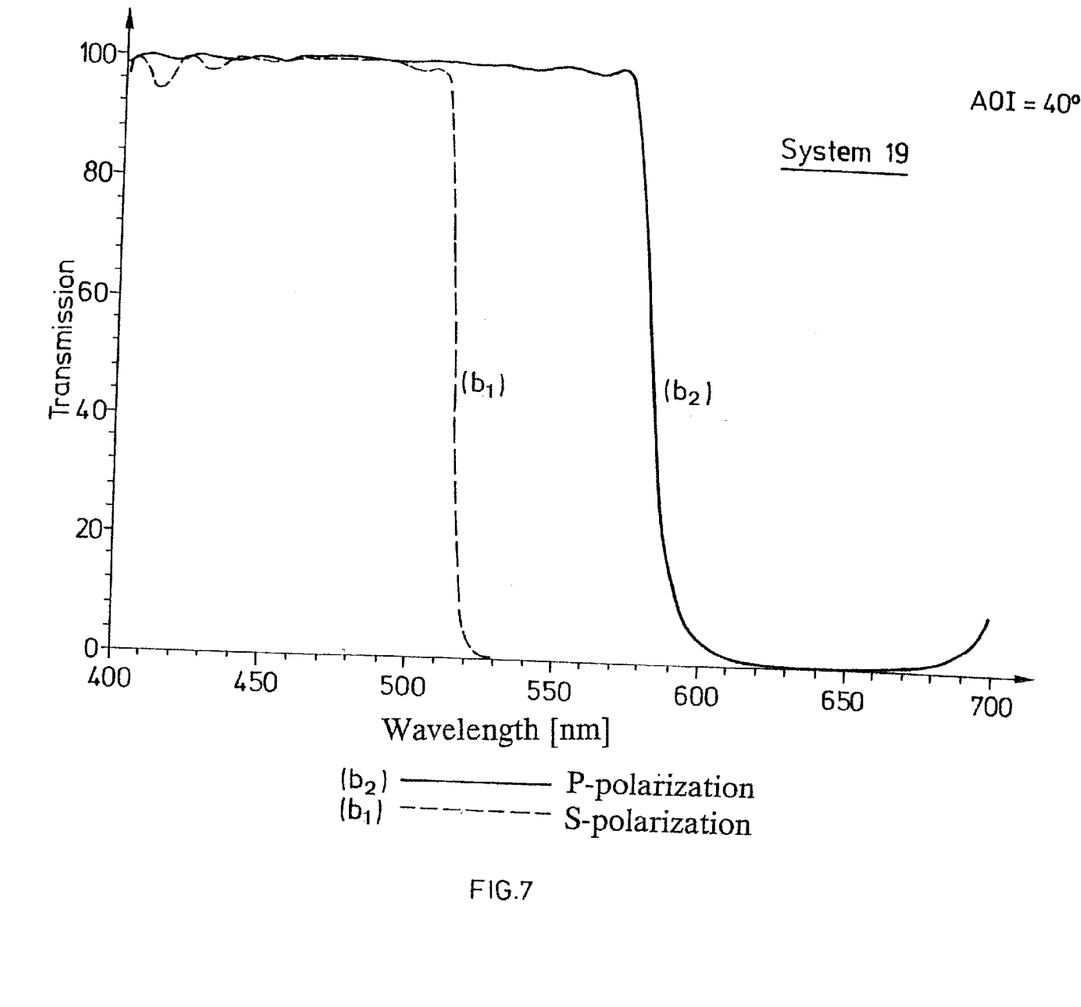
FIG. 7 is the realized spectra in analogy to the spectra ($b_1$) and ($b_2$) of FIG. 2.
Figure 8:
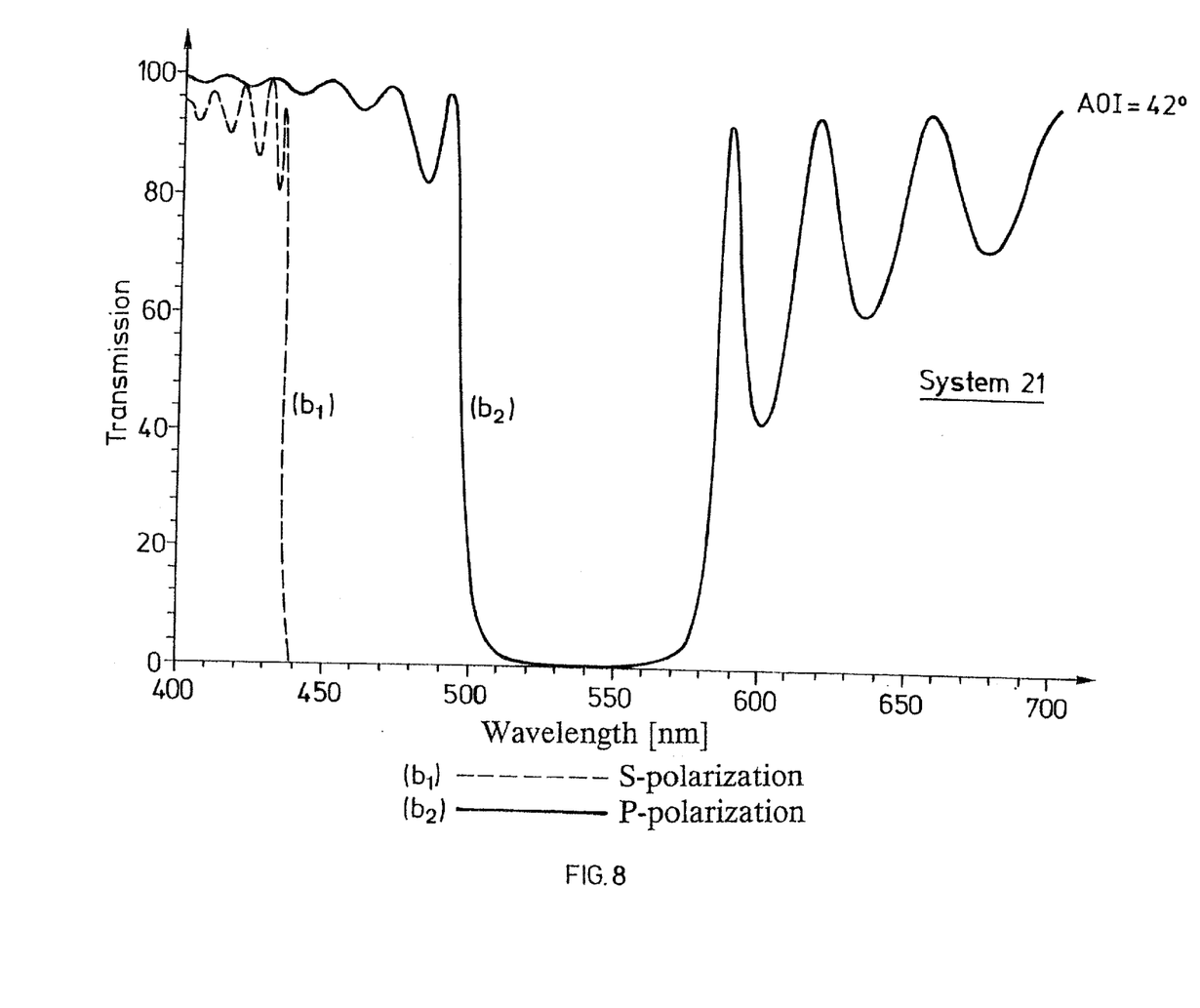
FIG. 8 is analogous to the spectra of FIG. 3b, and is the spectra realized on a layer system example.
Figure 9:
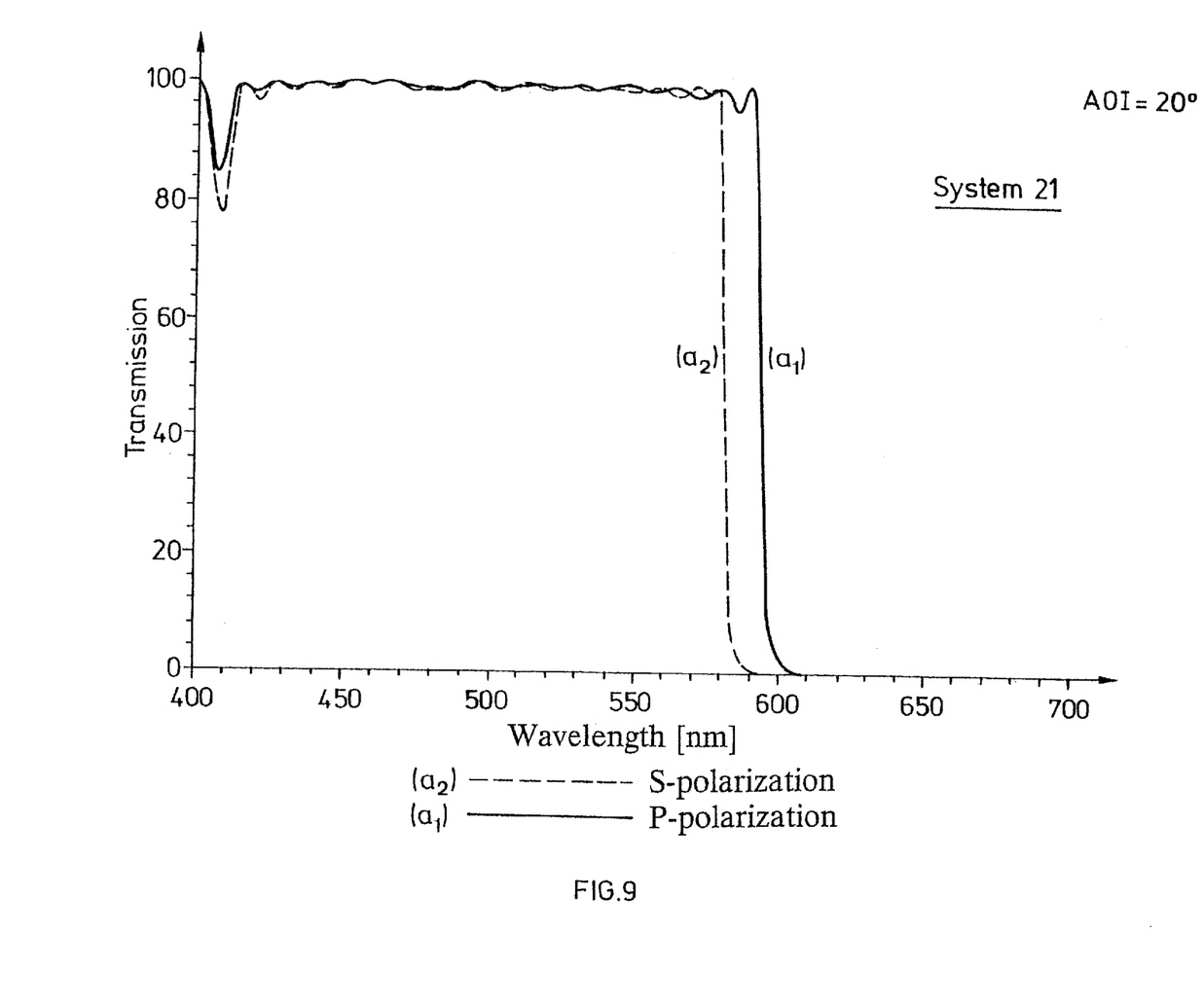
FIG. 9 is analogous to FIG. 3a, and is the realized spectra.
Figure 10:
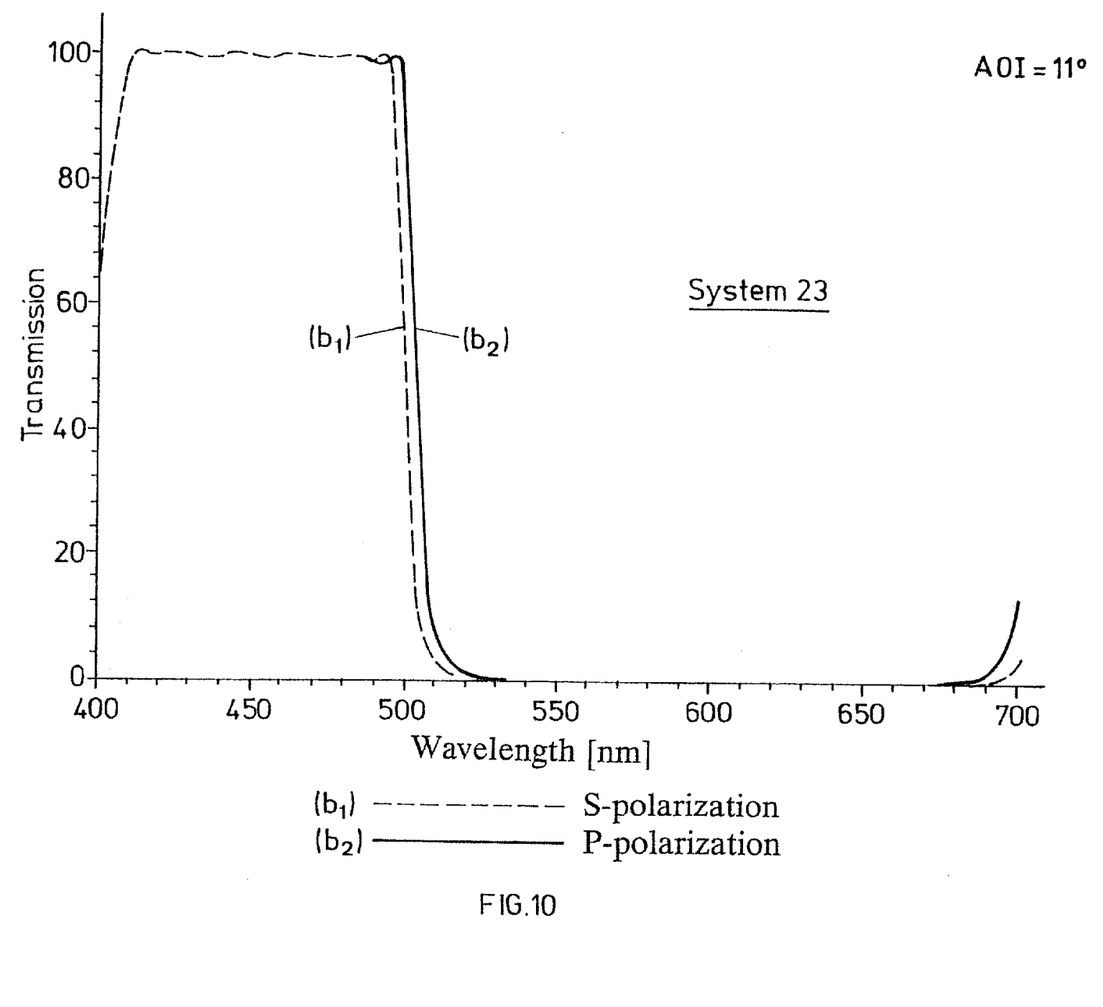
FIG. 10 is the spectra realized analogous to FIG. 4.

Based on the design compiled in the preceding Table result:

on thin film layer system 19 the spectrum according to FIG. 6 in analogy to the spectrum according to spectrum (a) of FIG. 2, the spectra according to FIG. 7 (see FIG. 2) for light below an angle of incidence of 40°, S-polarized light according to (b₁) and P-polarized light according to (b₂), spectra according to FIG. 8, in analogy to FIG. 3b on layer system 21, (b₁) for S-polarized, (b₂) for P-polarized light in each case incident at an angle of incidence of 42°, spectrum according to FIG. 9, in analogy to FIG. 3a on layer system 21, (a₂) for S-polarized, (a₁) for P-polarized light at an angle of incidence of 20°, spectrum according to FIG. 10 in analogy to FIG. 4 on thin film layer system 23, at an angle of incidence of 11°, (b₁) for S-polarized and (b₂) for P-polarized light.

With the configuration according to the invention the following advantages are obtained:

The configuration can be directly cemented with a beam splitter 15 without an air gap being required and without requiring an additional antireflection coating between beam splitter 15 and prism 1 as is necessary when providing an air gap.

With the configuration according to the invention optical color management systems can be built according to the invention such as, for example, projectors, monitors, video cameras, digital still picture cameras, etc.

Compared to X-cubes the configuration according to the invention has the advantage that a center line is absent as well as thereby that substantially smaller angles of light incidence are utilized, that for transmission and reflection values the independence from the polarization is increased, at least in specific spectral ranges.

That on one and the same thin film layer system (21, 19) light of one and the same spectral range is transmitted or reflected only as a function of the angle of incidence, is consequently utilized in order to circumvent the total reflections.

Figure 5:
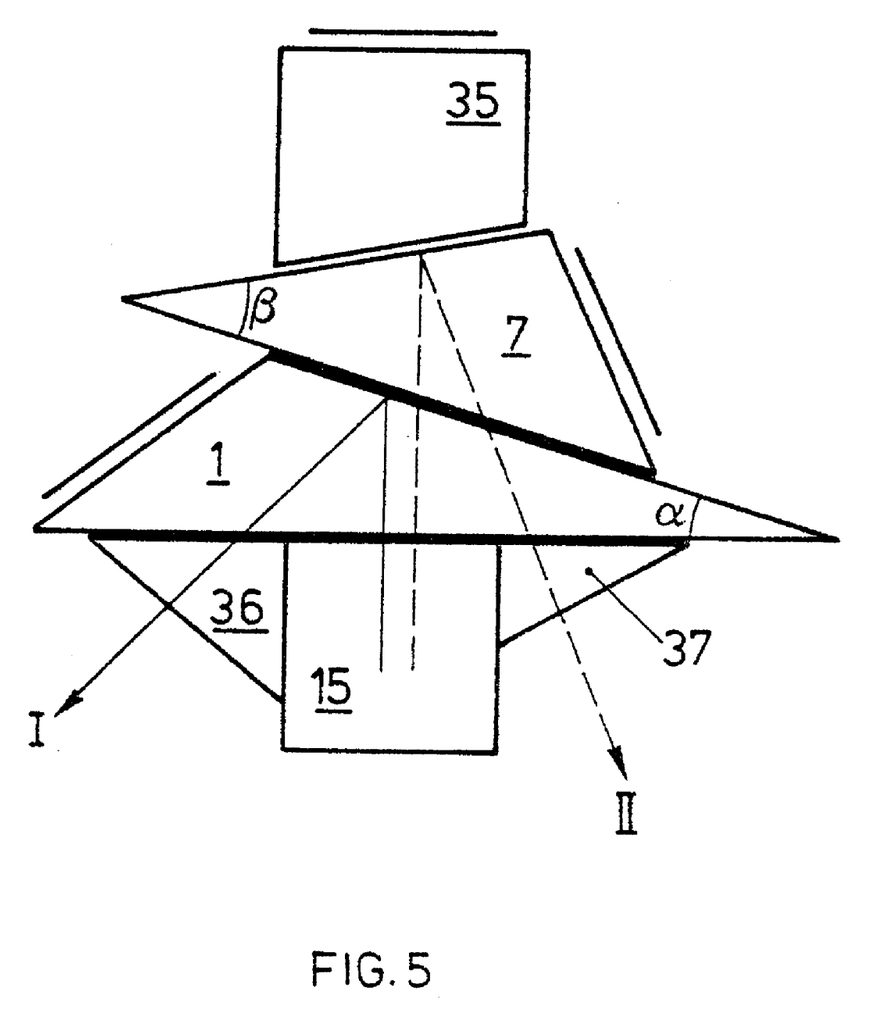
FIG. 5 is a further simplified representation of the configuration according to FIG. 1, the path of a ray of light misdirected due to non-ideal conditions.

Among the advantages is also that misdirected light in the manner described above with the aid of FIG. 5 through selection or design of the thin film layer systems is efficiently shielded [out], which has a positive effect on the image quality and thus the contrast. The configuration according to the invention permits in particular shielding [out] efficiently the often intense yellow line.

| List of Reference Symbols | |
|---|---|
| 1 | first prism |
| 2 | first face |
| 5 | first face |
| α | frist prism angle |
| 7 | second prism |
| 9 | second prism face |
| 11 | second prism face |
| β | second prism angle |
| 13 | face |
| 15 | polarization beam splitter |
| 19 | thin film layer system |
| 21 | thin film layer system |
| 23 | thin film layer system |
| 24 | emergent face |
| 25 | emergent face |
| 27 | LCD |
| 29 | emergent face |
| 31 | LCD |
| 32 | emergent face |
| 33 | LCD |
| 35 | compensation body |
| 36 | prism face |

-continued

| List of Reference Symbols | |
|---|---|
| 37 | prism |
| 38 | prism face |
| 39 | prism |
| 40 | antireflection layer system |
| A | optical axis |

What is claimed is:

1. A configuration for spectral color division of light and recombination of light and simultaneous spectral color division and recombination of reflected divided light wherein reflection occurs even under a change of polarization of the light, the configuration comprising:

a first prism (1) with two first prism faces (3,5) which form a first prism angle (a) between them;

a second prism (7) with two second prism faces (9,11) which define a second prism angle (β);

with one first (3) and one second (11) prism face being disposed parallel and opposite one another with no air gap therebetween and the two angles (α,β) with respect to the opposing faces (3,11) being disposed opposite to each other in the configuration, and wherein further;

light of a first spectral range (R), substantially incident perpendicularly on the other (5) first prism face, after entering the first prism (1) and double reflection (19,21) leaves the first prism;

light of a second (G) and third (B) spectral range, substantially perpendicularly incident on the other (5) first face, passes substantially unreflected through the first prism (1);

light of the second spectral range (G) after leaving the first prism (1) and entering into the second prism (7) and double reflection (21,23) leaves the second prism (7);

light of the third spectral range (B) passes substantially unreflected also through the second prism (7);

and wherein;

between the opposing first and second prism faces (3,11) a thin film layer system (21) is provided, whose angle-dependent reflection is matched to the first and second prism angle (α,β), such that light propagating from said first prism, of the first spectral range (R) and at an angle of incidence at least approximately equal to the first prism angle (α) is at least largely reflected, and light incident at this angle of incidence (α) and still propagating from said first prism and of the second and third spectral range (G,B) is at least largely transmitted, light of the second spectral range (G), propagating from said second prism and at an angle of incidence (2β−α) which is at least approximately equal to the difference between twice the second prism angle (2β) and the first prism angle (α) is at least largely reflected.

2. A configuration as claimed in claim 1, wherein light of the first spectral range is red light, that of the second spectral range is green light and that of the third spectral range is blue light.

3. A configuration as claimed in claim 1, wherein, in the area of the other (5) first prism face a further thin film layer system (19) is provided which in the presence of light, substantially incident perpendicularly, of the first, second and third spectral range (R, G, B) largely transmits this light and largely reflects light of the first spectral range (R) incident at an angle of incidence of at least approximately the twofold of the first prism angle (2α).

4. A configuration as claimed in claim 1, wherein, in the area of the other (9) second prism face an additional thin film layer system (23) is provided which at least largely reflects light of the second spectral range (G) at an angle of incidence at least approximately equal to the difference ($\beta-\alpha$) of the second ($\beta$) and of the fist ($\alpha$) prism angle, and at least largely transmits light of the third spectral range (B) and, further, preferably at least largely reflects light of the first spectral range (R).

5. A configuration as claimed in claim 1, wherein light of the second (G) and/or third (B) spectral range is reflected on the thin film layer system (21) provided between the opposing first and second faces (3, 11), after passing through the first prism leaves this substantially unreflected in the area of the other first face (5).

6. A configuration as claimed in claim 5, including a further prism (37) disposed with one of its faces opposite the other first prism face (5), in an area in which said light of the second (G) and/or third (B) spectral range is incident after reflection.

7. A configuration as claimed in claim 5, including a further thin film layer system (19) extending into the area on which the further prism (36) opposes the other first face (5).

8. A configuration as claimed in claim 1, wherein the thin film layer system (21) between the opposing first and second faces (3, 11) is at least largely reflecting yellow at an angle of incidence at least approximately equal to the first prism angle ($\alpha$) and that a further thin film layer system (19) provided in the area of the other (5) first prism face transmits yellow light at an angle of incidence at least approximately equal to twice the first prism angle ($2\alpha$).

9. A configuration as claimed in claim 4, wherein, on an additional thin film layer system (23) light of the first spectral range (R) is reflected and leaves the second (7) and first (1) prism substantially unreflected.

10. A configuration as claimed in claim 9, including a further prism (39) which opposes with one face the other first prism face (5) in an area in which at least one of the light of the first and third spectral range (R,B) is incident.

11. A configuration as claimed in claim 10, wherein, in said area one of an antireflection layer or a further prism (39) is provided.

12. A configuration as claimed in claim 1, wherein, for the first prism angle ($\alpha$), $10°\leq\alpha\leq 45°$.

13. A configuration as claimed in claim 1, wherein for the second prism angle ($\beta$), $\alpha<\beta\leq \frac{1}{2}(90°+\alpha)$.

14. A configuration as claimed in 1, wherein opposing the other second prism face (9) is disposed a face of a transparent compensation body (35).

15. A configuration as claimed in claim 1, wherein optical path lengths for light of the three spectral ranges through the configuration are substantially equal.

16. A configuration as claimed in claim 1, wherein, in the area of one emergent face each from the configuration for light of each of the three spectral ranges is provided an antireflection layer.

17. A configuration as claimed in claim 1, wherein the other (5) first prism face is in contact on a further optical structural element (15), and wherein the light entering a remaining configuration (19) after the optical structural element (15) is substantially P-polarized.

18. A configuration as claimed in claim 1 comprising part of an optical color management system.

* * * * *